US008390534B2

(12) United States Patent
Hamadou et al.

(10) Patent No.: US 8,390,534 B2
(45) Date of Patent: Mar. 5, 2013

(54) METHOD AND DEVICE FOR GENERATING TRACKING CONFIGURATIONS FOR AUGMENTED REALITY APPLICATIONS

(75) Inventors: Mehdi Hamadou, Erlangen (DE); Dirk Jahn, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 417 days.

(21) Appl. No.: 12/530,256

(22) PCT Filed: Mar. 8, 2007

(86) PCT No.: PCT/EP2007/052175
§ 371 (c)(1),
(2), (4) Date: Sep. 8, 2009

(87) PCT Pub. No.: WO2008/107021
PCT Pub. Date: Sep. 12, 2008

(65) Prior Publication Data
US 2010/0033404 A1    Feb. 11, 2010

(51) Int. Cl.
*G09G 5/00* (2006.01)
(52) U.S. Cl. .............................. 345/8; 348/61; 382/103
(58) Field of Classification Search .............. 345/8, 419, 345/427, 633; 348/61, E7.085; 382/284
See application file for complete search history.

(56) References Cited

U.S. PATENT DOCUMENTS

2002/0191862 A1* 12/2002 Neumann et al. ............. 382/284
2010/0164990 A1*  7/2010 Van Doorn ................... 345/633

FOREIGN PATENT DOCUMENTS

| DE | 102005046762 | 9/2005 |
|----|--------------|--------|
| DE | 10 2005 046 762 | 4/2007 |

OTHER PUBLICATIONS

Baratoff et al.: "Interactive multi-marker calibration for augmented reality applications" Mixed and Augmented Reality, 2002, ISMAR 2002, Proceedings, International Symposium on Sep. 30-Oct. 1, 2002, Piscataway, NJ, USA IEEE, pp. 107-116, XP010620947, ISBN: 0-7695-1781-1, Zusammenfassung, Abschnitte 2, 3 and 4, Abbildung 2; Magazine; 2002; US.
Nakazato et al.: "An Initialization Tool for Installing Visual Markers in Wearable Augmented Reality", Advances in Artifical Reality and Tele-Existence Lecture Notes in Computer Science; LNCS, Springer Berlin Heidelberg, BE, Bd. 4282, 2006, pp. 228-238, XP019051908 ISBN: 978-3-540-49776-9; Magazine; 2006; JP.
Baratoff G et al: "Interactive multi-marker calibration for augmented reality applications" Mixed and Augmented Reality, 2002, ISMAR 2002, Proceedings, International Symposium on Sep. 30-Oct. 1, 2002, Piscataway, NJ, USA IEEE, Seiten 107-116, XP010620947, ISBN: 0-7695-1781-1, Zusammenfassung, Abschnitte 2, 3 und 4, Abbildung 2; Magazine; 2002; US.
Yusuke Nakazato et al: "An Initialization Tool for Installing Visual Markers in Wearable Augmented Reality", Advances in Artifical Reality and Tele-Existence Lecture Notes in Computer Science; LNCS, Springer Berlin Heidelberg, BE, Bd. 4282, 2006, Seiten 228-238, XP019051908 ISBN: 978-3-540-49776-9; Magazine; 2006; JP.
Authoring von Augmented-Reality-Anwendungen Paelke V, Reimann, C. Deutsche Gesellschaft für Kartographie, Karthographische Schriften, vol. 10, Aktuelle Entwicklungen in Geoinformation und Visualisierung, Beiträge des Seminars Geovis, pp. 37-45; Others; 2006; DE.
Wolfgang Friedrich, ARVIKA, "Augmented Reality für Entwicklung, Produktion und Service", 2004, Publicis Corporate Publishing ISBN: 3-89578-239-4; p. 52-56, 92, 93.; Book; 2004; DE.
Jens-Martin Weidenhausen: Dissertation, 2006, Universität Darmstadt;"Mobile Mixed Reality Platform"; p. 7-11, 47, 48, 53-56, 71, 75, 76, 84, 86, 128-134.; Others; 2006.

* cited by examiner

*Primary Examiner* — Kevin M Nguyen
*Assistant Examiner* — Kenneth B Lee, Jr.

(57) ABSTRACT

A method and a device for determining tracking configurations for augmented reality applications are provided. A determination is automatically carried out based on a list of modules provided in a real environment and known tracking data of individual modules of the list in terms of an online operation at an operator of a system.

15 Claims, 1 Drawing Sheet

METHOD AND DEVICE FOR GENERATING TRACKING CONFIGURATIONS FOR AUGMENTED REALITY APPLICATIONS

CROSS REFERENCE TO RELATED APPLICATIONS

This application is the US National Stage of International Application No. PCT/EP2007/052175 filed Mar. 8, 2007, claims the benefit thereof and is incorporated by reference herein in its entirety.

FIELD OF INVENTION

The invention relates to a method and a device for generating tracking configurations for augmented reality applications.

BACKGROUND OF INVENTION

Augmented reality applications relate to a form of interaction between users and technology which superimposes information on a person's field of view, e.g. via a head mounted display, thereby enhancing that person's perceived reality. In order to be able to perform such a virtual enhancement of a person's visual field, so-called tracking processes are used. These can employ both hardware and software. For example, optical, inertial, acoustic and/or magnetic systems are used in tracking. These systems must be supplied with data in order to determine the user's position. This data can be, for example, three-dimensional models of a viewed object, images of the viewed object from different positions, identified salient points, lines or color regions or specially applied coded markers. All the information necessary for tracking is fed into the tracking process at its commencement.

In the industrial, medical and consumer fields, the tracking environments for augmented reality applications are many and varied, which means that the process of creating tracking configurations is complex and costly. This stands in the way of any widespread use of augmented reality applications in the fields mentioned.

Creating tracking configurations for a specified environment is complex because with known tracking processes the entire environment is used or rather analyzed.

Even slight differences between two similar but not completely coinciding environments often cause the particular tracking process used to fail, as e.g. contradictory data concerning the positions of salient points, lines or color regions is present, so that no consistency with the real scene can be achieved.

The creation/authoring of tracking configurations is based on generating parameter sets and data derived e.g. from reduced CAD models of the environment in question. For example, salient points, edges and/or color regions are extracted and a subset thereof is selected so that the tracking process used can work efficiently. Then the selection made must be tested in the real environment and where necessary adapted thereto. The creator/author must also select the salient points, edges and/or color regions such that they are evenly distributed in the real environment. This is the only way of ensuring the stability of the particular tracking process. These steps require good knowledge of the behavior of the particular tracking process on the part of the author and involve much time and effort for the author. High-quality superimposition of the augmentation over the real environment is therefore dependent to a large extent on the know-how and accuracy of the author.

Already known from DE 10 2005 046 762.8 are a system and a method for displaying augmented reality information. Here objects are captured as image information of a detail of an environment by means of a camera. The objects captured are identified and representations of the captured objects are reconstructed in virtual three-dimensional space on the basis of associated tracking information stored in the system. In addition, local coordinates of the objects are calculated and the position of the user and his/her viewing angle onto the relevant object is determined. The local coordinates are also assigned user information which is then inserted in a positionally correct manner into the user's field of view. The tracking information mentioned is read out contactlessly from at least one mobile data memory by means of a read/write device. The mobile data memory is mounted on the particular object to be captured.

SUMMARY OF INVENTION

An object of the invention is to specify a less complex method and device for generating tracking configurations for augmented reality applications.

This object is achieved by a method and by a device as claimed in the independent claims. Advantageous embodiments and developments of the invention are detailed in the dependent claims.

The particular advantages of the invention are that tracking configurations are generated automatically on the basis of known tracking data of individual modules or components that are present in the real environment. This takes place in online mode during use of the system by the operator. Consequently, no engineering step is required for generating tracking configurations. This means in practice a significant reduction in the time and effort required for generating tracking configurations.

An online method according to the invention merely requires knowledge of the list of the modules present in a real environment and associated tracking data. This list need not be exhaustive. The tracking process according to the present invention begins by searching for a first module in a camera-generated image of the real environment present. In this process, a computer unit compares the stored tracking data associated with the first module with features contained in the camera image. Once this initialization step has been successfully completed, the position and orientation of the already identified module captured in the camera image is continuously calculated in the sense of tracking. This allows augmentation information to be displayed in a positionally correct manner by means of a head mounted display, as long as the user views the augmentation information in the area of the identified module and the latter remains in his/her field of view.

Advantageously, in addition to said first module, other modules from the list of modules are searched for in the current camera image, this search being performed using stored tracking data assigned to these further modules. If another such module was located in the current camera image, said other module is inserted into the coordinate system generated in respect of the first module, thereby giving the features new positions in the real environment present. This procedure is repeated until the entire real environment is reconstructed.

The above described finding of other modules in the current camera image makes the tracking robust. In addition, the tracking configurations created can be stored for subsequent tracking use and also for documenting the actual layout of the real environment.

The above described online method for generating tracking configurations advantageously allows a set of tracking building blocks to be constructed which can be re-used again and again in order to make any number of real environments trackable, i.e. to generate reliable tracking configurations in respect of any real environments. For this purpose, only information as to which modules are installed in the real environment currently present is required.

This information is advantageously extracted from existing CAD plans, parts list or technical contexts, so that this information does not need to be entered manually. This reduces still further the time and effort necessary for generating tracking configurations.

BRIEF DESCRIPTION OF THE DRAWINGS

Further advantageous characteristics of the invention will emerge from the exemplary explanation thereof with reference to the accompanying drawings in which.

DETAILED DESCRIPTION OF INVENTION

Figure 1:
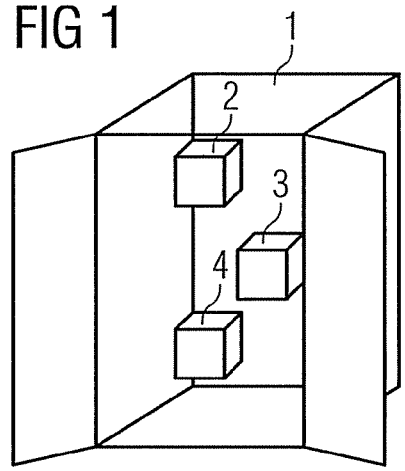
FIG. 1 shows a perspective sketch of a control cabinet with modules disposed therein.

The invention relates to a method and a device for determining tracking configurations for augmented reality applications.

The starting point for a method according to the invention is a real environment. In the exemplary embodiment shown in FIG. 1, this real environment consists of a control cabinet 1 in which modules 2, 3 and 4 are placed. Said modules 2, 3 and 4 are itemized in a list stored in the memory 10 shown in FIG. 2. Tracking data for each of these modules is also stored in another memory 9. Said tracking data is created by the supplier of the relevant module and is made available to the operator of the control cabinet 1 in addition to the manual describing the module and is stored by the operator in the memory 9. For example, the module 2 is a numerical control, the module 3 an I/O module and the module 4 a drive control. The tracking data contains information about the particular module, e.g. information concerning edges, recesses, color surfaces, etc.

Figure 2:
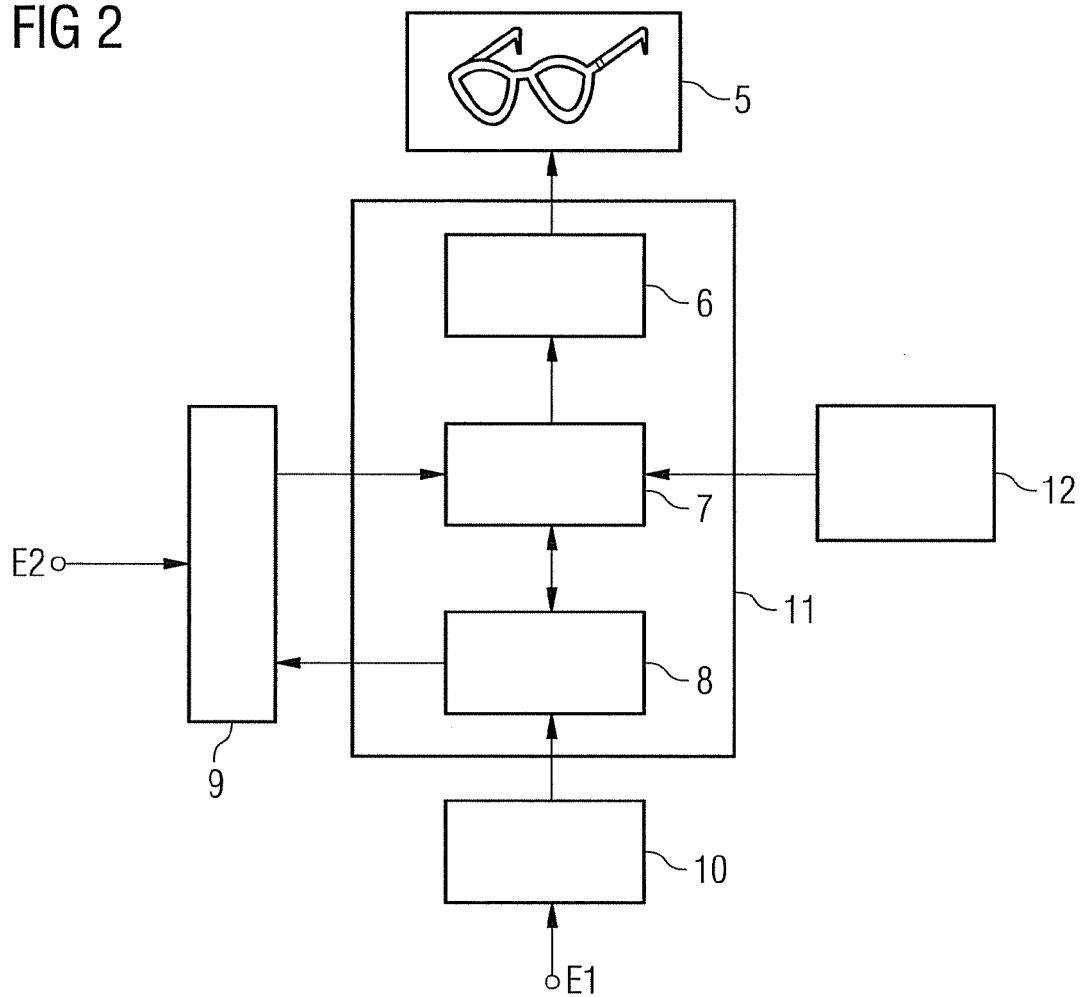
FIG. 2 shows a block diagram illustrating a method according to the invention.

During the runtime of the system, the operator initiates an augmented reality based application using at least one camera 12 by means of which images of the real environment are made available to a computer unit 11, e.g. images of the control cabinet 1 shown in FIG. 1.

The functions of the computer unit 11 consist of automatically executing a tracking process 7 using the parts list (stored in the memory 10) of the modules 2, 3, 4 installed in the control cabinet 1 and using the tracking data (stored in the memory 9) of the modules 2, 3, 4, converting the results provided by the tracking process 7 into tracking configurations in an authoring process 8, and feeding determined tracking information to a visualization process 6 whose function is to forward augmented reality information in a positionally correct manner to the augmented reality application 5 in question. In the exemplary embodiment shown in FIG. 2, said augmented reality information is inserted in a positionally correct manner into the field of view of a person wearing a head mounted display (eyeglasses).

The sequence of determining tracking configurations for the present augmented reality application is as follows:

First, data corresponding to a parts list of the modules 2, 3, 4 installed in the control cabinet 1 is written to the memory 10 by the system operator via an input E1. This is performed e.g. by means of a keyboard. In addition, the tracking data of the modules 2, 3, 4 which is provided by the supplier of the modules 2, 3, 4 is read into the memory 9 via the input E2. This tracking data is stored on a data carrier by the module supplier and is transferred from the data carrier via the input E2 to the memory 9 at the system operator end.

One of the installed modules 2, 3, 4, e.g. the module 2, is then selected from the parts list stored in the memory 10. In response thereto, its tracking data stored in the memory 9 is fed to the tracking process 7 and, as part of said tracking process, compared with the image produced by the camera 12 in order to identify the module 2 in this image and then define a three-dimensional coordinate system associated with said module 2. If said module 2 is identified in the camera image, a pose is calculated by the computer unit 11. This pose defines the position and orientation of the camera 12 in relation to the real environment captured, in the present exemplary embodiment in relation to the control cabinet 1. This pose which is determined anew at predefined time intervals is passed to the visualization process 6 where it is used for positionally correct representation of the augmentation information in the present augmented reality application. For example, this augmentation information, which is displayed to the user superimposed on the real environment in his/her field of view via a head mounted display, guides the user through repair instructions relating to the modules in the control cabinet 1.

In the next step, as part of the authoring process the computer unit 11 automatically selects another module from the parts list stored in the memory 10. The tracking data of the other module, e.g. module 3, stored in the memory 9 is then transferred to the tracking process 7 where, as part of a comparison of said tracking data with the image provided by the camera 12, the other module is searched for in the camera image. If the other module 3 is located in the camera image, its features are transformed such that they are placed in the coordinate system of the first module 2. The tracking configurations determined in respect of the first module 2 and of the second module 3 then constitute a single entity and enable a larger space to be made reliably trackable.

After that, as part of the authoring process 8 the computer unit 11 selects other modules from the parts list stored in the memory 10, looks for these other modules in the image supplied by the camera 12 and registers also these other modules in the coordinate system of the first module 2.

The searching for other modules and their registration in the coordinate system of the first module 2 takes place until uniform coverage of the control cabinet 1 has been achieved. This uniform coverage permits stable tracking. The tracking configurations created are transferred from the authoring process 8 or rather from the computer unit 11 to the memory 9 where they are stored so that they are available for subsequent use.

If only one module were located, only a small region around that module would be precisely trackable since, with increasing distance from said module, a tracking error increasing with distance would arise in subsequent tracking processes. The more modules located, the larger the precisely trackable region becomes, as a plurality of pinpointed modules and therefore sufficient tracking features are present over the environment to be tracked.

The other modules are also preferably selected from the list subject to the further criterion that primarily modules of different kinds are looked for in the camera image. The advantage of this is that, for the selection, the assignment of located modules to the modules in the list is unambiguous. If ambiguities arise, these are resolved with the aid of additional features such as the network topology present and the hardware configuration. This information is stored, for example, in the memory 10 in addition to the list of modules.

As an alternative to the above described option of storing on a data carrier the tracking data associated with the modules 2, 3, 4 that was created by the supplier of said modules and transferring it to the memory 9 via an input E2, this tracking data can also be retrieved via the Internet from a database of the supplier and stored in the memory 9.

As an alternative to the above described option of entering the parts list stored in the memory 10 by means of a keyboard, said parts list can also be extracted from an existing CAD plan, an existing parts list or an existing technical description.

The present invention consequently relates to a method for generating tracking configurations for augmented reality applications wherein the tracking configurations are generated automatically on the basis of known tracking data of individual modules in the real environment. This takes place in online mode during use of the system by the operator. Consequently, no engineering step is required for generating tracking configurations for the entire real environment present. This has the effect of significantly reducing the time and effort necessary for creating tracking configurations. An online method according to the invention merely requires knowledge of the list of the modules present in the real environment and associated tracking data. All the other information required for tracking is created automatically using this starting information.

An online method according to the invention allows a set of tracking building blocks to be set up which can be used again and again to make any real environments trackable. This only requires information concerning the parts list of the modules installed in the real environment present.

In contrast to known methods, instead of using the entire real environment for setting up the tracking configurations, only knowledge of the modules installed in the real environment and the tracking data associated with these modules is used. The overall tracking configuration is automatically created online during the runtime of the system, the local features of the individual modules being transformed such that these modules are locatable in a uniform coordinate system relative to the environment.

The invention claimed is:

1. A method for determining tracking configurations for augmented reality applications, comprising:
   providing an installation with modules in a real environment;
   storing first data corresponding to a list of the modules provided in the installation of the real environment in a first memory, wherein the first data are written into the first memory by an operator of the installation;
   storing second data containing tracking data associated with the modules provided in the real environment in a second memory, wherein the tracking data are created by a supplier of the modules and are stored by the operator of the installation in the second memory;
   locating a first selected module in an image provided by a camera by a tracking process using tracking data associated with the first module, the tracking data being read out from the second memory;
   determining tracking configurations associated with the located first module by an authoring process;
   automatically selecting a second module from the list of the modules stored in the first memory;
   automatically locating the second module in the image provided by the camera by the tracking process using tracking data associated with the second module, the tracking data being read out from the second memory; and
   automatically determining tracking configurations associated with the located second module by the authoring process.

2. The method as claimed in claim 1, further comprising:
   assigning automatically a coordinate system to the first module after the first module has been located.

3. The method as claimed in claim 2, further comprising:
   placing automatically the second module in the coordinate system of the first module after the second module has been located.

4. The method as claimed in claim 1, further comprising:
   storing the tracking configurations determined as part of the authoring process in the first or second memory.

5. The method as claimed in claim 1, further comprising:
   storing the second data corresponding to the tracking data associated with the modules provided in the real environment on a data carrier;
   reading out the second data from the data carrier; and
   transferring the second data to the second memory.

6. The method as claimed in claim 1, further comprising:
   entering the first data corresponding to the list of the modules provided in the real environment by an input unit.

7. The method as claimed in claim 1, further comprising:
   extracting the first data corresponding to the list of the modules provided in the real environment from data available anyway.

8. A device for determining tracking configurations for augmented reality applications, comprising:
   a first memory for storing first data corresponding to a list of modules of an installation provided in a real environment, wherein the first data are written into the first memory by an operation of the installation;
   a second memory for storing second data corresponding to tracking data associated with the modules provided in the real environment, wherein the tracking data are created by a supplier of the modules and are stored by the operator of the installation in the second memory;
   a camera for providing an image corresponding to the real environment; and
   a computer unit configured to
      automatically select modules from the list of the modules stored in the first memory;
      automatically locate the modules in the image provided by the camera by a tracking process using tracking data read out from the second memory;
      automatically determine, by an authoring process, tracking configurations associated with the modules located in the camera image, and
      automatically control, by a visualization process, a positionally correct display of augmentation information in an augmented reality application.

9. The device as claimed in claim 8, wherein the augmented reality application has a head mounted display and the augmentation information is superimposed onto the user's field of view in the head mounted display.

10. The device as claimed in claim 8, wherein the tracking configurations are stored in the first or second memory.

11. The device as claimed in claim 9, wherein the tracking configurations are stored in the first or second memory.

12. The device as claimed in claim 8, wherein the computer unit is configured to assign a coordinate system to a first located module.

13. The device as claimed in claim 8, wherein the computer unit is configured to determine a position and orientation of the camera in relation to the real environment captured.

14. The device as claimed in claim 8, wherein the computer unit is configured to determine automatically tracking configurations of other modules after the tracking configurations associated with the first module have been determined.

15. The device as claimed in claim 14, wherein the computer unit is configured to insert the tracking configurations associated with the other modules into the coordinate system assigned to the first module.

* * * * *